United States Patent [19]

Taenzer

[11] Patent Number: 4,746,843
[45] Date of Patent: May 24, 1988

[54] MOTOR CONTROL CIRCUIT AND DRIVE AMPLIFIER FOR A PERMANENT MAGNET DC TORQUE MOTOR

[75] Inventor: Jon C. Taenzer, Palo Alto, Calif.

[73] Assignee: Adept Technology, Inc., San Jose, Calif.

[21] Appl. No.: 694,705

[22] Filed: Jan. 25, 1985

[51] Int. Cl.⁴ .............................................. H02P 6/02
[52] U.S. Cl. ..................... 318/138; 318/254; 318/689; 318/811
[58] Field of Search .............. 318/696, 254, 811, 138, 318/689

[56] References Cited

U.S. PATENT DOCUMENTS

| | | | |
|---|---|---|---|
| 4,250,435 | 2/1981 | Alley et al. | 318/138 |
| 4,316,132 | 2/1982 | Geppert | 318/723 |
| 4,419,615 | 12/1983 | Muto et al. | 318/811 |
| 4,494,052 | 1/1985 | Kelleher et al. | 318/254 |
| 4,528,486 | 7/1985 | Flaig et al. | 318/254 |

Primary Examiner—William M. Shoop, Jr.
Assistant Examiner—Dave Martin
Attorney, Agent, or Firm—Flehr, Hohbach, Test, Albritton & Herbert

[57] ABSTRACT

A control system for a brushless DC torque motor is disclosed. The motor comprises three coils, the wires at the end of each coil being brought out and connected to an amplifier that provides the current control signals to the coils. These control signals are generated based on a combination of commutation input command bits which are effectively multiplied by a pulse-width modulation control input word to form a pseudo-sine wave current signal at the input to each coil. By combining the pulse width modulated (pwm) current command word with an input command which defines a square wave, a pseudo-sine wave signal is provided for each coil which effectively controls the current to the motor coil in accordance with the value of the pwm commands. In each amplifier, the current control signal is compared with a servo feedback signal from the coil to define an error signal which, when amplified, becomes the actual input current signal to the coil. In order to allow for the fact that this is a bipolar system, a dead zone is defined between positive and negative drive signals so that no overlap occurs in the signals which could cause undue stress to the output transistors. Appropriate protection is also provided against numerous fault conditions, for example, any open circuit or short circuit condition.

20 Claims, 6 Drawing Sheets

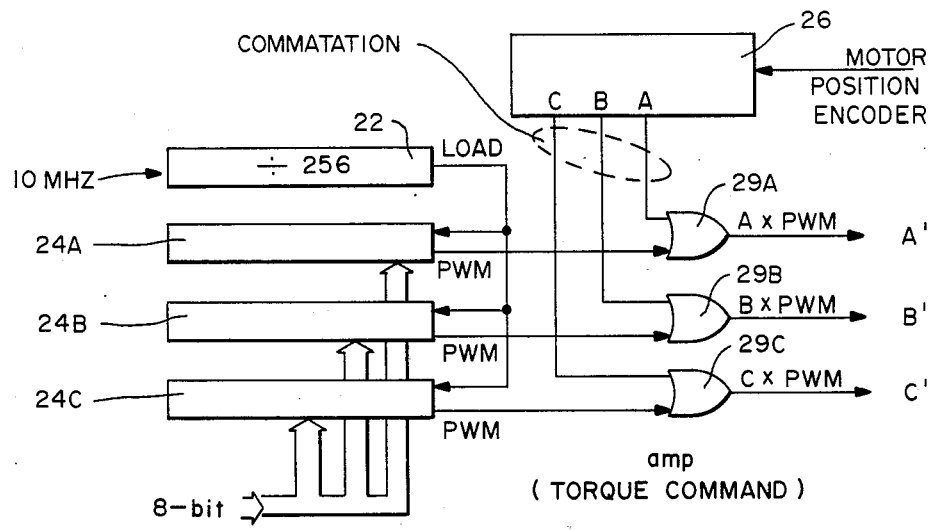
FIG.—1
| COMMAND | C | B | A |
|---|---|---|---|
| 1 | 0 | 0 | 1 |
| 2 | 0 | 1 | 1 |
| 3 | 0 | 1 | 0 |
| 4 | 1 | 1 | 0 |
| 5 | 1 | 0 | 0 |
| 6 | 1 | 0 | 1 |
FIG.—2B
CURRENT COMMANDS
$$\bar{\Phi} A = A - \frac{B'' + C''}{2}$$
$$\bar{\Phi} B = B - \frac{A'' + C''}{2}$$
$$\bar{\Phi} C = C - \frac{A'' + B''}{2}$$
FIG.—2C
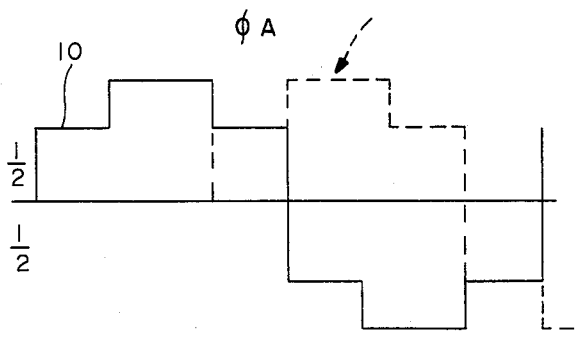
FIG.—2A
| $\bar{\Phi}A$ | $\bar{\Phi}B$ | $\bar{\Phi}C$ | COMMAND |
|---|---|---|---|
| 1 | $-\frac{1}{2}$ | $-\frac{1}{2}$ | 1 |
| $\frac{1}{2}$ | $\frac{1}{2}$ | $-1$ | 2 |
| $-\frac{1}{2}$ | 1 | $-\frac{1}{2}$ | 3 |
| $-1$ | $\frac{1}{2}$ | $\frac{1}{2}$ | 4 |
| $-\frac{1}{2}$ | $-\frac{1}{2}$ | 1 | 5 |
| $\frac{1}{2}$ | $-1$ | $\frac{1}{2}$ | 6 |
FIG.—2D

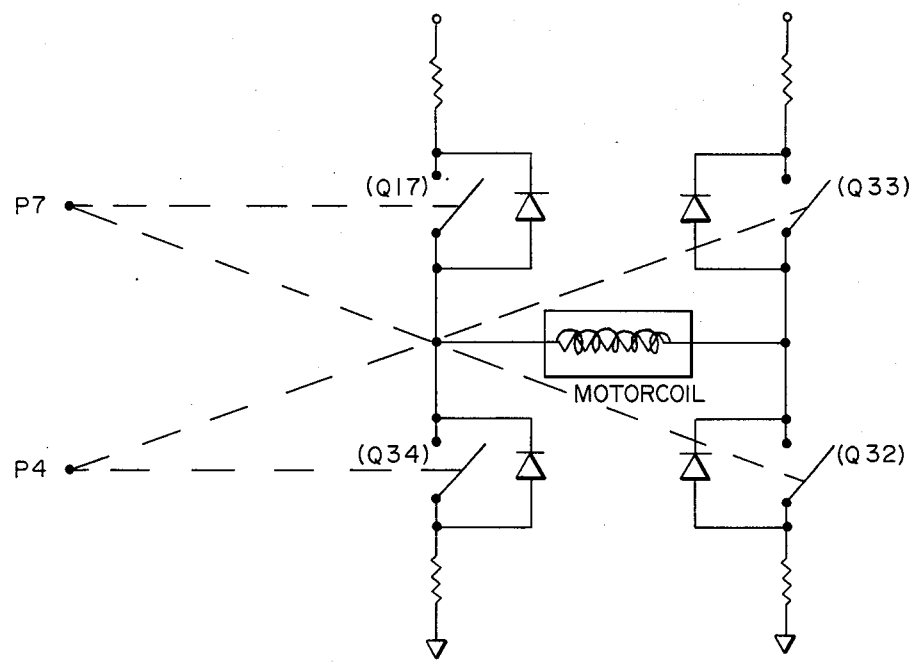
FIG.—3
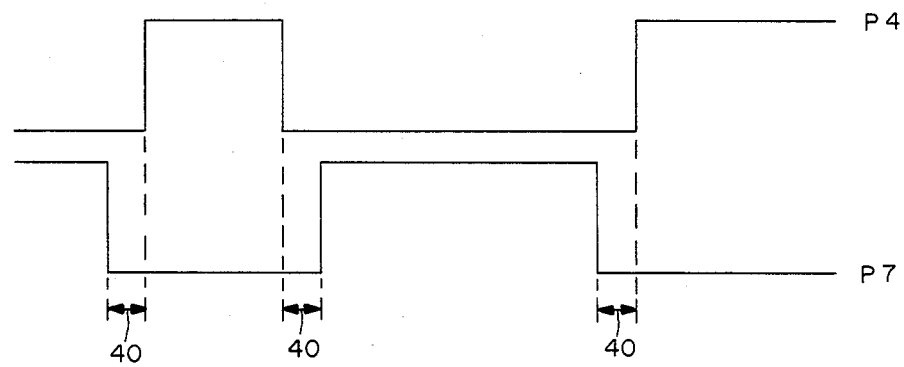
FIG.—4A
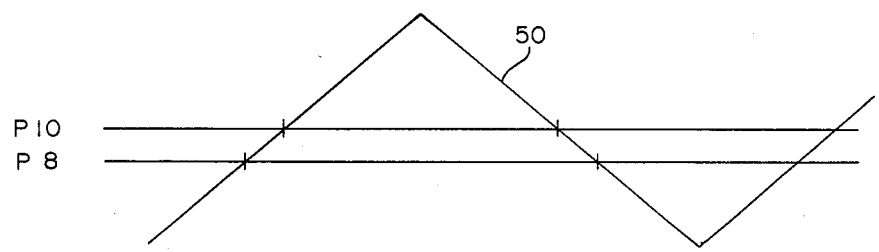
FIG.—4B

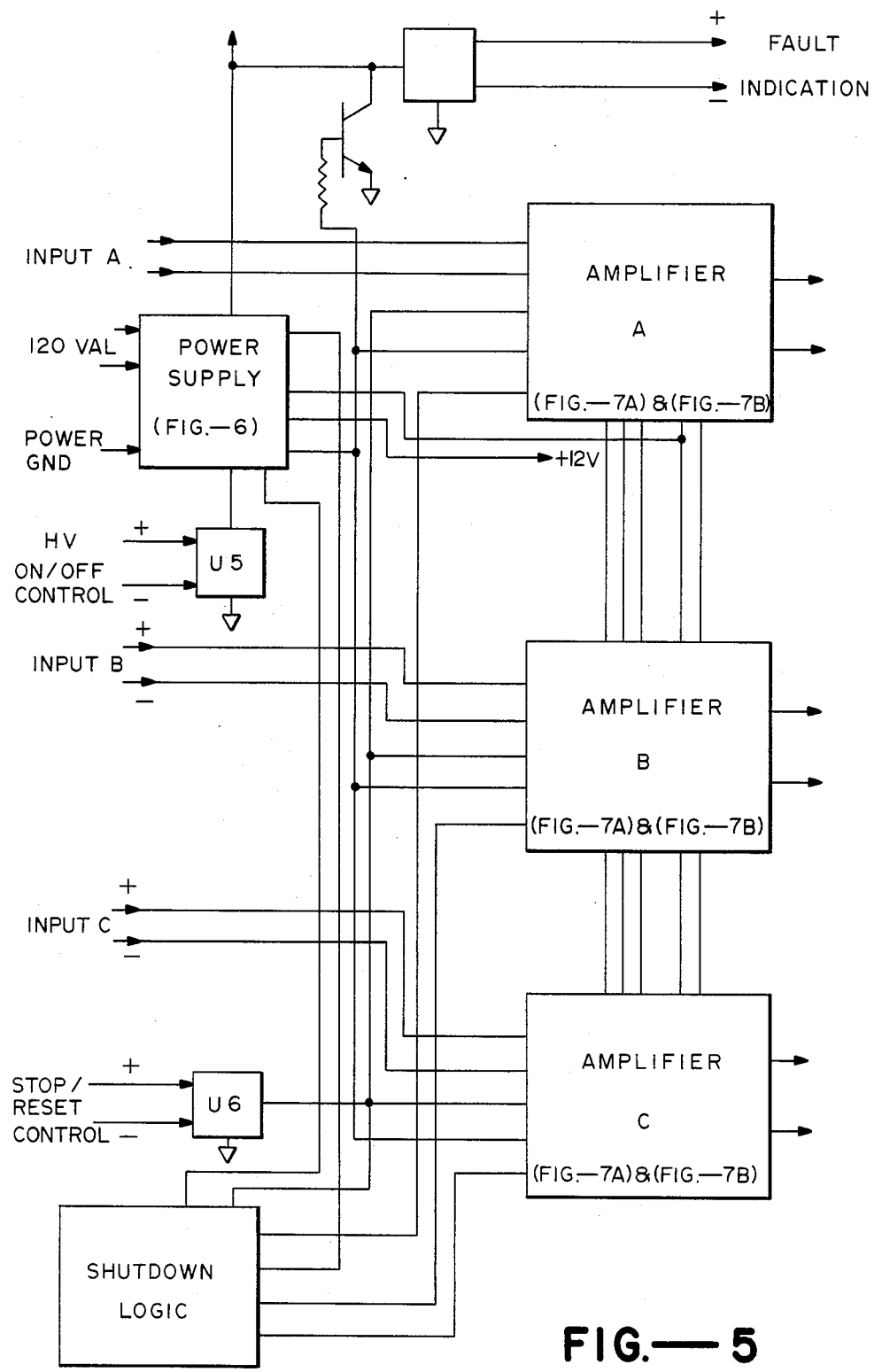
FIG.—5

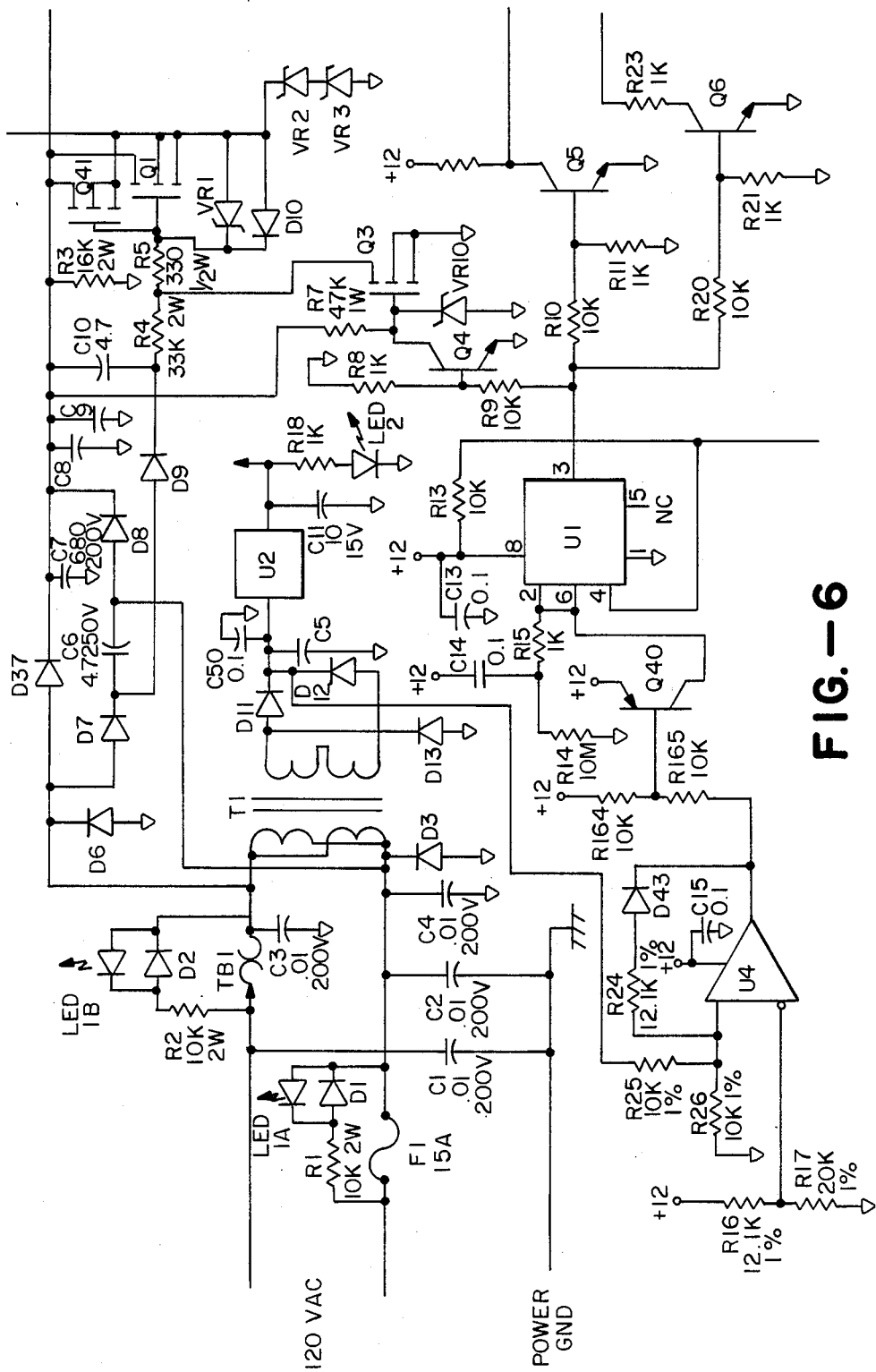
FIG.—6

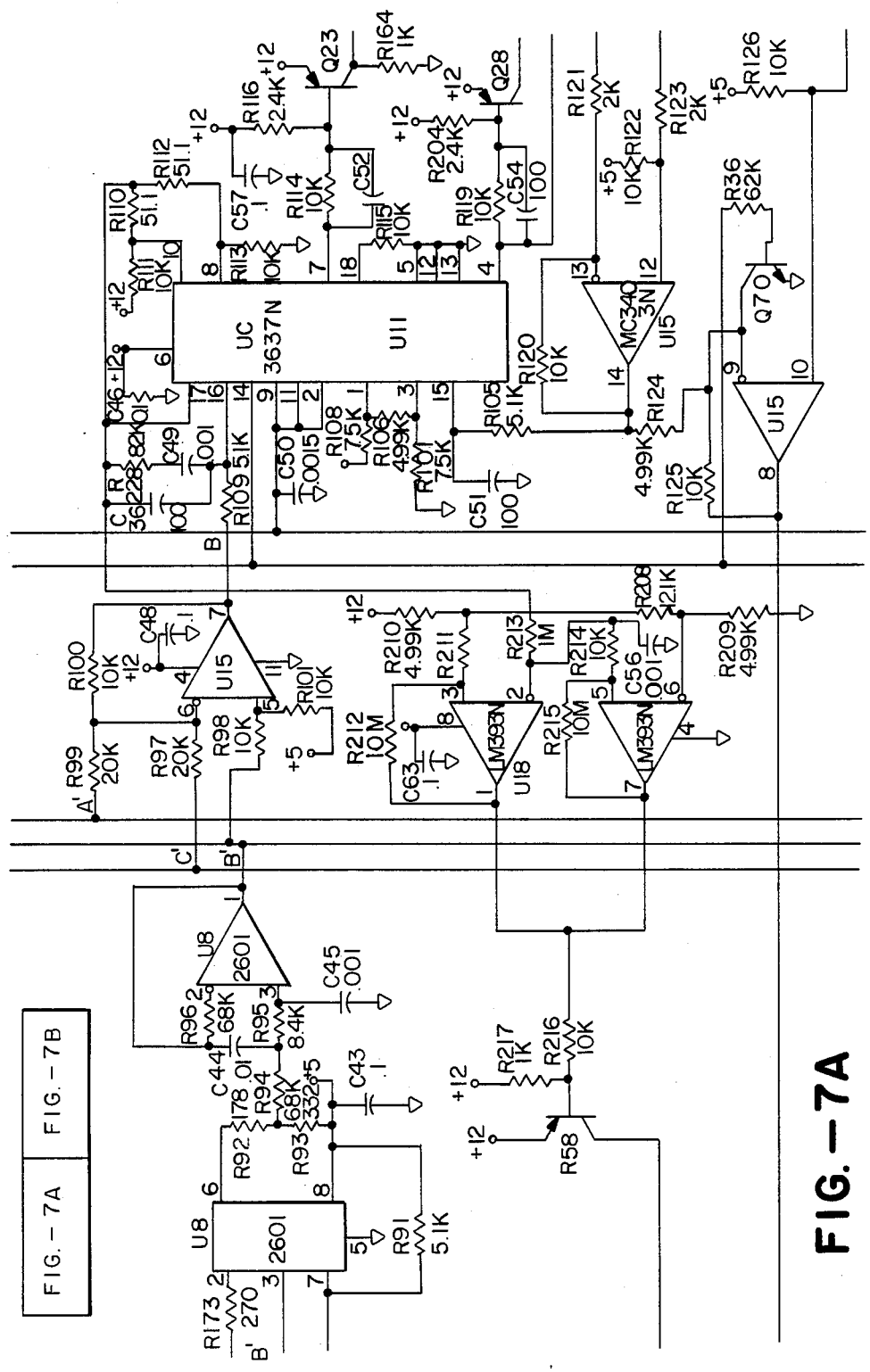
FIG.—7A

MOTOR CONTROL CIRCUIT AND DRIVE AMPLIFIER FOR A PERMANENT MAGNET DC TORQUE MOTOR

This invention is directed generally to the field of a motor control circuit for a direct drive amplifier, and more particularly to a motor control amplifier for directly driving each individual coil of a multi-coil motor with current in either of two directions. This amplifier is intended to be used in conjunction with the robot described in U.S. application Ser. No. 694,585, filed 1/24/85, entitled DIRECT DRIVE ROBOT and invented by CARLISLE. That patent application is incorporated herein by reference.

This amplifier is used to drive two of the four motors in the above robot, specifically those located at the arm and wrist. The other two motors, which are variable reluctance direct drive stepper motors located at the pedestal axis, are driven and controlled using the amplifier described in application Ser. No. 695,170, now U.S. Pat. No. 4,625,158, invented by Jon Taenzer and entitled, MOTOR CONTROL CIRCUIT FOR VARIABLE RELUCTANCE MOTOR. This application is also incorporated herein by reference.

It is an objective of the present invention to provide an amplifier for directly driving each coil of a brushless permanent magnet DC motor.

In typical motors of the brushless permanent magnet type, the coils are connected in a delta configuration and three wires, one connected to the junction of each two coils or to the three ends of the "Δ" are brought out for connection to the drive current sources.

In the present invention, six wires are brought out, that is the two wires at the end of each coil, and each pair of wires of each coil is connected to the output of a single amplifier. A result of this unusual approach is to provide complete control of the current in each winding. This provides for very accurate positioning of the motor. Driving each coil independently provides distinct advantages; however, it would then also be possible to turn all three coils fully on at the same time. This condition would not produce any torque and is undesirable.

It is another objective of the present invention to so design the amplifiers and control circuitry so that all three coils can never be fully turned on or energized with maximum current at the same time. The amplifiers can then be designed for the condition where the maximum number of coils to be fully turned on at any one time is one; then the heat sinks, fuses and dissipation levels in all the circuitry can be down-sized to accommodate this more limited amplifier operating condition.

A significant difference must be taken into account in the design of the present amplifier from the design of the amplifier disclosed in the incorporated application entitled, "MOTOR CONTROL CIRCUIT FOR VARIABLE RELUCTANCE MOTOR." In that amplifier as with any variable reluctance motor driver, the current in the coil always causes attraction of the rotor; the polarity of the voltage can be reversed to change the value of the current flow, but reversing the direction of the current flow serves no purpose. In the present invention, the current must flow in either direction in each coil, due to the connection of the two ends of each coil to an amplifier, and the design of the motor; and result is that the permanent magnet rotor can either be pushed or pulled by each coil. The motor coils are energized using three sine waves which are 120° out of phase. It is necessary to control the drive amplifiers using a microprocessor; but it is difficult to generate sine waves economically using hardware and processor intensive to generate sine waves with software. In order to accomplish this using only digital control, it is an objective of the present invention to provide a simplified means for producing pseudo-sine waves.

A further major difficulty in the design of these control amplifiers is that the motors to be driven need to rotate at very high speed, up to 3,000 revolutions per minute. Yet based on a typical resistance of 8 ohms, an inductance of 0.005 henry in each coil, and a 20 pole motor, the maximum speed where full torque is available for good control of a three-coil system in a delta or "Y" configuration is about 500 revolutions per minute.

According to the present invention, the wires at the end of each coil are brought out from the motor and an amplifier is directly across each coil; the desired speed of up to 3,000 rpms can now be achieved, because the $\mu/R$ time constant which normally inhibits current change in the coils can be essentially disregarded. The current in the coils can be quickly modified simply by changing the polarity of the voltage on the coil. In other words, the voltage across the coil defines the rate of change of the current according to the formula $E = L \times di/dt$. Given a certain ratio of voltage to inductance, the rate of change of current within the coil is defined. For example, in a preferred example of the present invention, a voltage of 160 volts is applied to the coils. Given an inductance of 0.005 henry, a slew rate (di/dt) of 32,000 amperes per second is achieved. The maximum current swing in any single step of the pseudo-sine wave is up to 2½ amps per coil; this swing can be achieved in less than 1/10 millisecond, which is sufficiently rapid to maintain full torque control at a speed of 3,000 rpms.

By using high-speed switches in the output switch section of the amplifier, a rapid change in voltage across the coil can be achieved, and a high rate of change of current flow be achieved and maintained through the coil. Therefore, a further advantage of the present invention is that if the system is running at a constant current, a linear ramping rate to a different steady state current is achieved.

Yet another objective of the present invention is to provide a motor which incorporates a positioning scheme which is compatible with a digital microprocessor controller. Achievement of this objective is necessary to provide a high degree of positioning accuracy which is necessary with a high precision, high operating speed robot.

Yet another objective of the present invention is to provide a system in which any operating defects are easy to diagnose and wherein the performance is relatively consistent among all the amplifier boards on the system in spite of variations in the parts used to build each amplifier board.

These and other objectives are achieved in the present system, wherein the motor comprises three coils, the wires at the end of each coil being brought out and connected to an amplifier which provides the current control signals. These control signals are generated based on a combination of commutation input command bits which are effectively multiplied by a pulse-width modulation control input command word to form a pseudo-sine wave signal at the input to each coil. By combining the pulse width modulated (PWM) current command word with an input command which defines a square wave, a pseudo-sine wave signal is provided for each coil which effectively controls the current to the motor coil in accordance with the value of the PWM commands. In each amplifier, the control word is compared with a servo feedback signal from the coil to define a bipolar error signal which, when amplified, becomes the actual input signal to the coil. In order to allow for the fact that this is a bipolar system, means are incorporated for providing a dead zone between positive and negative drive signals so that no overlap occurs in the signals which could cause undue stress to the output transistors. Appropriate protection is also provided against any open circuit or short circuit condition, utilizing essentially these design principles disclosed in the incorporated applications.

The principles and operating modes of the circuit of the present invention are disclosed with regard to the following figures:

FIG. 1 shows a block diagram of the input control scheme of the present invention;

FIGS. 2A, B, C, D show an outline of the logic utilized to develop the pseudo-sine wave signals which comprise the control signals to the individual motor coils;

FIG. 3 illustrates the switching of the output transistors which are used to couple control signals to the motor coils in the present system;

FIGS. 4A and 4B illustrate the timing principles and signals which are used to develop a dead zone to insure against overlap in the signals sent to the switching transistors of FIG. 3;

FIG. 5 is a block diagram of the essential elements of the motor control system of the present invention apart from the data input system shown in FIG. 1;

FIG. 6 is a schematic diagram of details of the power supply used in the control system of FIG. 5;

FIGS. 7A and 7B are detailed schematics of the amplifier connected to each coil in the system of the present invention.

Figure 7B:
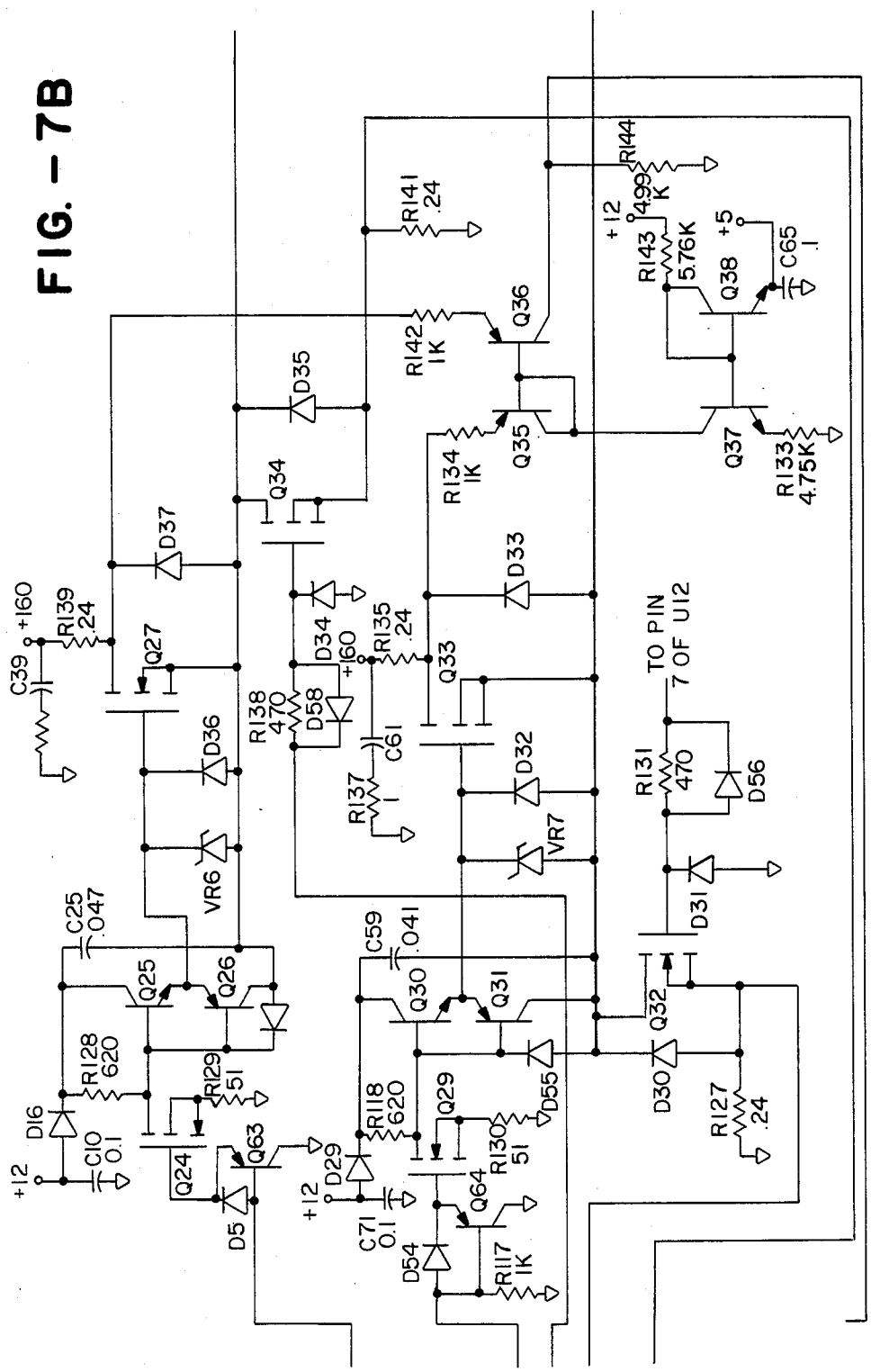
Figure 8:
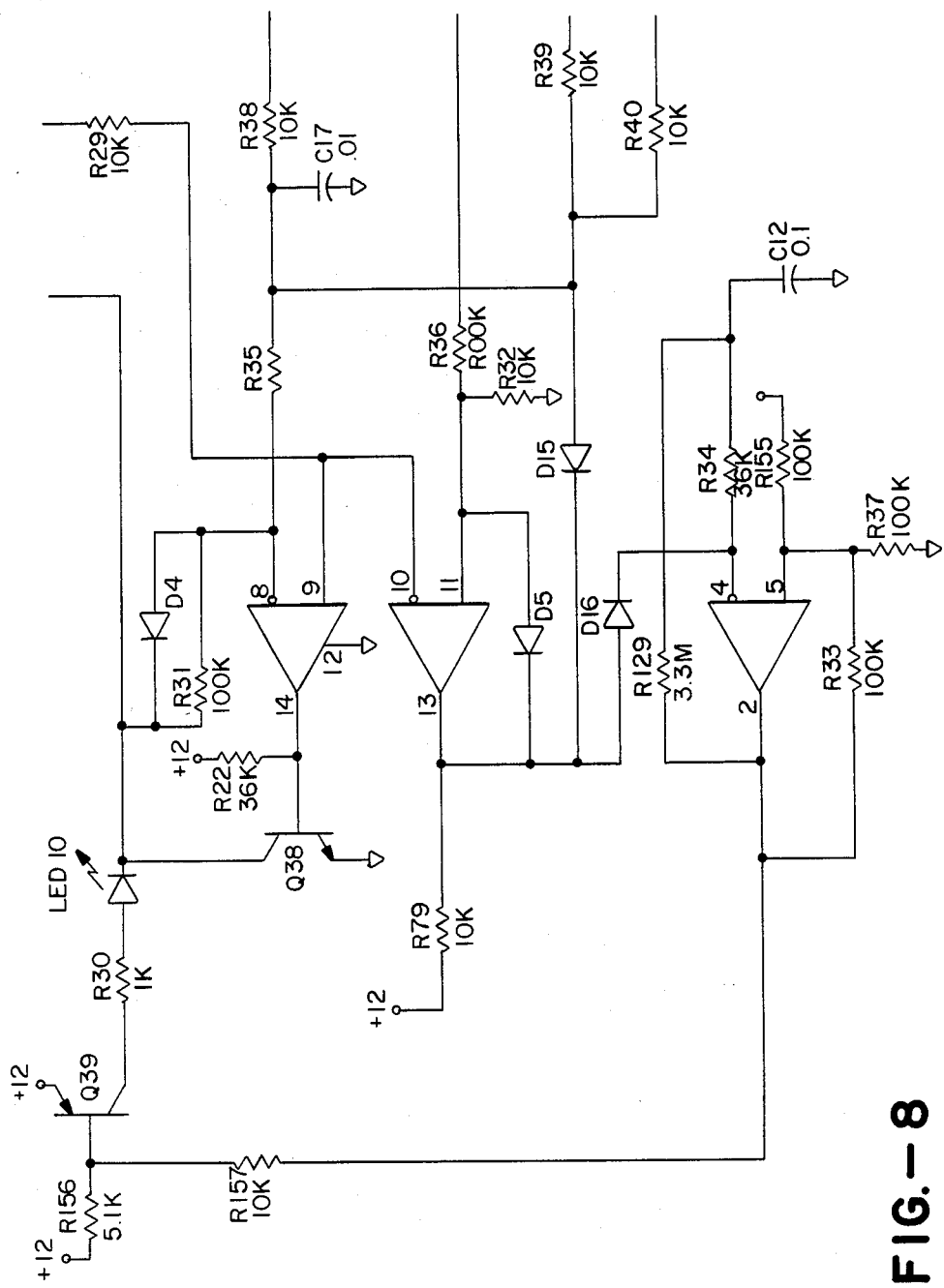
FIG. 8 is a detailed diagram of the shutdown logic utilized in the amplifier of the present invention.

In an amplifier for use with a DC brushless three-phase permanent magnet type motor, the objective is to provide to the three coils sinusoidal waves which are as nearly as possible exactly 120° out of phase. Satisfaction of this objective results in substantially constant torque without torque variation or ripple. Pseudo-sine waves can be created by an appropriate combination of square wave signals; the result has quite low ripple and provides an excellent approximation to constant torque output with significantly less complexity and cost that true sine wave drive. The signals in FIG. 2A represent pseudo-sine waves which can be applied to the coils of the motor to achieve the necessary drive level. It has been found through experiment that these pseudo-sine waves will actually simulate a true sine wave with only a 7 percent ripple, a very desirable result. The formation of these pseudo-sine waves, which also define the amplitude of the current, begins with the architecture shown in FIG. 1. The input to the counters 24A, 24B, 24C comprises the control word which is provided on bus 20; it is stored in each of the counters using a 10 mhz clock and a divider 22. The control word is an 8-bit word defining the commanding amplitude of the current. It is stored in counters 24A, 24B, 24C, and read out on a line PWM through a gate 29A, 29B, 29C which receives as its other input the input commands shown in FIG. 2B. These commands are a direct function of rotor position as sensed by command generator 26 from a motor position encoder (not shown) of a standard type.

It can be seen by looking down the columns in FIG. 2B that each bit of a command word changes state at regular intervals to define a square wave, and that the command words themselves which cycle regularly out of the position encoder circuit 26 only change one bit at a time, using what is called a Gray Code. The significance of using a Gray Code is that only one bit changes at a time, so that no incorrect or indeterminate states are achieved. Both the 000 and 111 states are ignored, for either state would result in equal current to all three phases of the motor, resulting in no torque at all. (The 111 state is specifically left out also because this causes drive current to all three coils, an operating state that is not to occur at any time.

These input commands from encoder circuit 26, when multiplied by the PWM current control word received on bus 20 and stored in counters 24 produces a word A', B' or C', each of which is a square wave signal and contains the current command information as a PWM signal during one half of the square wave. Each amplifier contains means for summing these three signals according to one of the three equations shown in FIG. 2C. Summation of these three commands uses the logic incorporating op amp U15 shown in FIG. 7A. The output of this summing device at pin 7 regularly changes state in accordance with the values shown in FIG. 2D to form the three pseudo-sine waves separated by 120°, the values shown in this figure being multiplied on an instantaneous basis by the current command PWM word received over the input bus.

The essential conversion between the digital input 8 bit command word and the needed current command, is achieved by generating the product of each input command and a square wave command signal, and then producing a summation of these product signals to produce a current command which simulates a sine wave as shown in FIG. 2A.

It should be noted that the input commands A, B and C do have real significance in relation to the coils in the motor; i.e., first coil A is on, then coils A and B are on, then only coil B, and so on. (If the 000 or 111 command were used, it would result in no command to the coil or in all the coils being turned on.) Therefore, neither of these states are used. A rotation of the motor from one pole pair to the next requires a complete sequence of the commands; a typical motor incorporates 5 or 10 pole pairs. Therefore, a single complete rotation would require 5 sequences of input commands for a 10 pole motor, or 20 complete sequences for a 10 pole motor.

Taking these input commands and multiplying them by the PWM representation of the desired current or torque provides the signal $A^1$, $B^1$, or $C^1$ shown in FIG. 1. In describing this exemplary embodiment, only the amplifier which uses the $B^1$ signal to develop a signal to its associated coil is shown in FIGS. 7A and 7B; therefore, some variation of the connection of the signals $A^1$, $B^1$, $C^1$ would be needed in the amplifiers associated with the A and C coils to implement the equations shown in FIG. 2C.

It is also important to note that since the same PWM signal is fed as the input to each counter 24 A, B, C, then one of the six possible combinations of signal output currents shown in FIG. 2D is flowing at any given time to the three motors coils from the three separate amplifiers. Further, this scheme is especially useful with a three-phase, brushless DC permanent magnet motor where the wires at either end of the coil are both brought out to couple to the amplifier. As explained in the introduction to this application, with this highly advantageous arrangement, the controllable speed of the motor is significantly increased. Finally, the sequence of codes shown in FIG. 2B makes it apparent that for each command A, B or C will result at the output from the associated gate 29 in a signal which is PWM for half the time and nothing for half the time, regardless of the actual PWM value being generated out of the counter 24A.

The remainder of the amplifier operates in similar fashion as the amplifier described in the Taenzer application incorporated herein by reference except that the output is controlled in bipolar fashion and not just unipolarly. Therefore, for a detailed discussion of the theory of operation of the amplifier shown in detail in FIG. 7A and 7B, reference should be had to that application.

In general, the PWM signal as modified by the input command is coupled through the optocoupler U8 into each amplifier. The output of this optocoupler is coupled through the low pass filter which comprises a portion of the quad amplifier U15 having inputs 2, 3 and output pin 1. This low pass filter eliminates the 39 khz frequency which is the basic PWM rate. The values of the resistor and capacitor coupled to this low pass filter differs somewhat from the incorporated application to provide a 3 khz, 2 pole Butterworth filter to allow faster commutation of the signals to the coils than in the other application.

The output of the three low pass filters in the three amplifier sections form three analog voltages representing current commands A", B", C". These are combined according to the formulas shown in FIG. 2C in the combinatorial amplifiers which include a second portion of the quad amplifier U15 having inputs 5, 6 and an output at pin 7. The output signal at pin 7 of device U15 is 5 volts for no current, 2 volts for full positive current, and 8 volts for full negative current. These voltages are chosen to stay within the common mode ranges of the error amplifiers U11 which are incorporated in the amplifier.

It can be seen by comparison of the detailed schematic drawings in this application with the schematics in the incorporated application that a different type of chip is used for the central chip U11. The reason is that this amplifier must be a bipolar amplifier because of the need to provide signals which swing plus and minus. In contrast to the other amplifier, two output signals must be provided to each coil, only one of which is on at any given time. However, there is also a brief period of time marked by reference 40 in FIG. 4A called a "dead zone" when neither one is on. This dead zone is necessitated by the fact that only a single positive 160 volt power supply is used in what functions as a bipolar amplifier. What is effectively happening in the output section of the amplifier is represented schematically in FIG. 3 which shows that transistors Q17, Q32 connected across the output coil are closed simultaneously to cause current to flow in one direction; they are opened and transistors Q33, Q34 are closed to cause current to flow in the opposite direction in response to the complementary signals shown in FIG. 4A. The control signals shown in FIG. 4A are produced by comparing a constant frequency oscillator (FIG. 4B, 50) with error signals P8, P10 which represent the difference between the commanded coil current and instantaneous coil current.

The frequency of the oscillator of this control chip and in turn the control chips on the other two amplifiers is set by capacitor C50 and resistor R115 coupled to inputs 9 and 18, respectively, of device U11. This triangle voltage 50 is compared with the error voltages P8, P10; the two square wave output signals are provided when the sawtooth is either more positive or more negative that the error voltages. These two offset error voltages are defined in a fairly straightforward way. The output of the operational amplifier internal to U11 which compares the input command signal at pin 16 with the feedback servo signal at pin 15 appears at output pin 17. This signal is coupled to the resistive bridge which comprises resistors R110, R111, R112, and R113. The two outputs from the bridge go into the comparator inputs 8, 10; (this connection occurred internally on the other amplifier). The result of this comparison appears at pins 4, 7 of the command chip U11 and is represented in FIG. 4A as square wave signals which command the state of the output transistor section. In other words, the voltage into pin 10 is the error voltage from pin 17 plus a little DC voltage; the input into pin 8 is the error voltage minus a little DC voltage to create the necessary offsets.

In all other significant respects, the operation of the present system is the same as the operation of the incorporated amplifier including provision of the current control signals to the coils through the switch control transistor Q27, Q34, Q33, Q32, as described above. The feedback current to detect any short circuit fault is provided by the arrangement of transistors Q35, Q36, Q37, Q38. The function of providing a feedback current for the servo loop is provided by a pair of resistors to ground R141, R127. These are the inputs to the differential amplifier which is a portion of U15; the output at pin 14 is proportional to the current in the coil. Another section of amplifier U15 takes the output which represents the current from the power supply and compares it with the output representing the current into ground, the output at pin 8 indicating a short circuit.

Open circuits are detected using the double comparator U18 which receives its inputs through a filter comprising capacitor C56 and resistor R213; the dual comparison is necessary because of the bipolar nature of the output command.

An output transistor Q58 pulls up a line to drive a fault indication in the event of an open circuit condition. It should be noted that the chip specified for this amplifier does not have an internal 5-volt supply; therefore, by simply taking the 12-volt DC supply developed in the low voltage section of the control system and putting it into a three-terminal regulator U3, the desired five volts can be formulated for all three chips. A single LED is used to indicate that both the 12 volts and the 5 volts exist or fail to exist by combining the outputs of the 5-volt and 12-volt supply, and coupling them to a single LED which will light only if both supplies are present. This LED is shown as LED2 in FIG. 5.

The additional safety efficiency functions which are found in the referenced amplifier are also repeated here, including the failure mode shutdown logic, the high voltage cutoff and the power regeneration effects which are used with the power supply.

Other modifications, variations or enhancements to the specific embodiment disclosed herein may become apparent to a person of skill in the art who studies the subject invention disclosure. Therefore, the scope of the present invention is to be limited only by the following claims.

What is claimed:

1. A control system for a permanent magnet multiphase, brushless DC torque motor comprising a permanent magnet rotor, at least three coils surrounding the rotor for positioning the rotor, a plurality of amplifiers, one of said amplifiers being coupled across each of said coils for separately controlling the current flowing in each said coil, each said amplifier comprising means for providing bipolar drive current signals to each of said coils, a control system comprising means for providing commutation/torque command signals to each of said amplifiers, and each said amplifier comprising means for converting said commutation/torque command signals into current control signals and amplifier means for converting the current control signals into bipolar drive current signal which is the output of each of said amplifiers.

2. A control system as claimed in claim 1 wherein said commutation/torque command signals are in pulse width modulated format.

3. A system as in claim 1 or 2 comprising means in each said amplifier for uniquely combining the commutation/torque command signals to each of said amplifiers to define a unique one of said current control signals.

4. A system as in claim 1 including means for defining a succession of input commutation signals and means for combining the commutation signals with an input torque command signal defining instantaneously demanded torque to form said commutation/torque command signals.

5. A system as in claim 4 wherein said means for providing commutation/torque command signals include means for establishing a multi-bit communtation signal as a function of motor position, each of said commutation signal bits being multiplied by one of said torque command signals.

6. A system as in claim 5 wherein said means for providing commutation/torque command signals includes means for defining a repetitive sequence of said input comutation signals relating to the coils of said motor and as a function of the position of said motor.

7. A system as in claim 6 wherein said multi-bit commutation signal comprises a sequence defined in Gray Code.

8. A system as in claim 5 wherein said multi-bit commutation signal comprises three bits, said system comprising three of said amplifiers, all of said bits feeding each said amplifiers, the numbers of said bits being equal to the number of said amplifiers.

9. A system as in claim 6 wherein each said commutation signal changes state in a sequence to define a square wave.

10. A system as in claim 8 wherein the motor includes three phases, and a current control signal in each amplifier of the three amplifiers A, B, C is defined by the equations $$A = A^1 - (B^1 + C^1)/2$$

$$B = B^1 - (A^1 + C^1)/2$$

and $$C = C^1 - (A^1 + B^1)/2$$

where A is the current control signal in the first of said three amplifiers A, B, C; B is the current control signal in the second of said three amplifiers A, B, C; and C is the current control signal in the third of said three amplifiers A, B, C; and $A^1$, $B^1$ and $C^1$ are the three commutation/torque command signals applied to the three amplifiers.

11. A system as in claim 1 wherein each of said amplifiers comprise means for controlling the bipolar drive current signal out of each amplifier in response to an error signal which is a function of the commutation/torque command signal to each said amplifier and a feedback signal which is a function of instantaneous current in said coil.

12. A system as in claim 2 comprising means for providing a multi-bit commutation signal representing motor position, each bit from said commutation signal being combined with said torque command signal command to define said pulse width modulated commutation/torque command signal to said amplifiers.

13. A system as in claim 4, 9 or 12 including means cooperating with each of said amplifiers to use said commutation torque command signals to form a pseudo-sine wave as said current control signal for controlling the bipolar drive current signal to the coil connected to said amplifier.

14. A system as in claim 5 or 12 wherein said commutation/torque command signals are applied substantially simultaneously to each of said amplifiers, each said amplifier including means for uniquely combining said commutation/torque command signals to generate said current control signal.

15. A system as in claim 1 wherein each said amplifier responds to said commutation/torque command signals for generating an analog current control signal representing desired drive current to the associated motor coil and includes
means for developing a feedback signal representing current in the coil attached to said amplifier,
means responsive to the current control signal and the feedback signal for developing an error signal for controlling application of a high voltage to the coils, said means for providing bipolar drive current to the coil associated with the amplifier comprising
first and second output switch means for conveying said bipolar current to said coil, and
means responsive to said error signal for coupling said high voltage source to said coils through first switch means during a first time period and second switch means during a second, non-overlapping time period.

16. A system as claimed in claim 15 including means for defining a dead time zone between each of said first and second time periods.

17. A system as in claim 16, said means for providing bipolar drive current comprising means for developing a sawtooth oscillator signal, means for developing first and second voltages offset from said error signal, said first and second output switches being turned off for a time period defined by the oscillator signal voltage falling between the first and second offset voltages.

18. A system as in claim 5 including means for causing the amplifier output to said coil to go to zero upon detection of an erroneously generated command word.

19. A system as in claim 18 wherein said erroneous multi-bit commutation signal comprises all zeros or all ones.

20. A system as in claim 11 including comparator means for generating said error signal as a function of the difference between the current control signal and the feedback signal.

* * * * *